United States Patent
Richter et al.

(10) Patent No.: US 9,996,594 B2
(45) Date of Patent: Jun. 12, 2018

(54) METHOD, ARTICLE AND SYSTEM FOR TIME DEPENDENT SEARCH

(75) Inventors: Matthias Richter, Sinsheim (DE); Ralf Dentzer, Hockenheim (DE); Gisella Dominguez Anzuinelli, Heidelberg-Kirchheim (DE)

(73) Assignee: SAP SE, Walldorf (DE)

( * ) Notice: Subject to any disclaimer, the term of this patent is extended or adjusted under 35 U.S.C. 154(b) by 677 days.

(21) Appl. No.: 12/492,482

(22) Filed: Jun. 26, 2009

(65) Prior Publication Data

US 2010/0332495 A1   Dec. 30, 2010

(51) Int. Cl.
*G06F 7/00* (2006.01)
*G06F 17/30* (2006.01)

(52) U.S. Cl.
CPC .. *G06F 17/30551* (2013.01); *G06F 17/30548* (2013.01); *G06F 17/30598* (2013.01)

(58) Field of Classification Search
CPC ......... G06F 17/30551; G06F 17/30598; G06F 17/30548
See application file for complete search history.

(56) References Cited

U.S. PATENT DOCUMENTS

| | | | |
|---|---|---|---|
| 7,716,236 B2 * | 5/2010 | Sidhu et al. | 707/766 |
| 7,996,441 B2 * | 8/2011 | Johnson et al. | 707/804 |
| 2004/0025171 A1 * | 2/2004 | Barinov | G06F 17/30286 719/318 |
| 2009/0157810 A1 * | 6/2009 | Tripathi et al. | 709/204 |

* cited by examiner

*Primary Examiner* — Paul Kim
(74) *Attorney, Agent, or Firm* — Jones Day

(57) ABSTRACT

A method and system for time dependent search is described. A search manager may receive a query for time dependent information relating to a base object and a time period. The search manager may search a search optimized storage system of technical objects for a technical object that matches the query. Each technical object may include a reference to time dependent information stored by a base object and a validity period. The validity period for each technical object is chosen by time stretching logic such that valid time dependent information is available for all time periods.

17 Claims, 9 Drawing Sheets

Receiving by a search manager a query relating to time dependent information associated with a base object and a time period

110

Searching a storage system of technical objects for a technical object that matches the query

120

Retrieving a base object referenced by the technical object from the storage system

130

Sending the retrieved valid time dependent information to a display device

| ORGANIZATIONAL ASSIGNMENTS |
|---|
| BEGIN DATE |
| END DATE |
| POSITION |
| MANAGER |
| COMPANY |
| COST CENTER |
| JOB ID |
| REPORTING LINE UNIT |

610

| EMPLOYMENT TERM REFERENCES |
|---|
| BEGIN DATE |
| END DATE |
| WORKING TIME |
| WORK PLACE ADDRESS |

FIG. 7A

| Time Dependend Information | Begin Date | End Date | Value |
|---|---|---|---|
| Validity of Base Object Work Agreement | 01.01.2004 | 31.12.2010 | |
| Costcenter Assignment of WorkAgreement | 01.01.2005 | 31.12.2007 | CostCenter 1 |
| Costcenter Assignment of WorkAgreement | 01.01.2008 | 31.12.2010 | CostCenter 2 |
| Reporting Line Unit Assignment of WorkAgreement | 01.01.2004 | 15.07.2007 | RepLine 1 |
| Reporting Line Unit Assignment of WorkAgreement | 16.07.2007 | 31.12.2010 | RepLine 2 |

FIG. 7B

| Begin Date | End Date | Reporting Line | Cost Center |
|---|---|---|---|
| 01.01.2004 | 31.12.2004 | RepLine1 | not available |
| 01.01.2005 | 15.07.2007 | RepLine1 | CostCenter1 |
| 16.07.2007 | 31.12.2007 | RepLine2 | CostCenter1 |
| 01.01.2008 | 31.12.2010 | RepLine2 | CostCenter2 |

FIG. 7C

| Begin Date | End Date | Reporting Line | Cost Center |
|---|---|---|---|
| 01.01.0001 | 31.12.2004 | RepLine1 | not available |
| 01.01.2005 | 15.07.2007 | RepLine1 | CostCenter1 |
| 16.07.2007 | 31.12.2007 | RepLine2 | CostCenter1 |
| 01.01.2008 | 31.12.9999 | RepLine2 | CostCenter2 |

METHOD, ARTICLE AND SYSTEM FOR TIME DEPENDENT SEARCH

BACKGROUND

Current enterprise application search solutions may take long periods of time to complete a search for valid time dependent data. For example, when searching for data within a traditional relational database, an enterprise application search engine may have to search through numerous records before locating the requested time dependent data. In addition, several steps may need to be performed to determine whether the time dependent data is valid.

For example, a user may wish to search for valid data within an enterprise management system. Particularly, the user may require valid time dependent data about an object. Time dependent data may include information about an employee such as telephone number, address or employment contracts. Typically, time dependent data has a time period in which the data is valid. In conventional systems, a search must be done throughout a database for the requested time dependent data. In addition, the system must verify that the time dependent data found within the database is valid. This may consume large amounts of time and system resources.

Even after a search has been performed, current enterprise application search solutions may fail to identify all relevant valid time dependent data. For example, if time dependent data was valid in the past or will become valid in the future, the valid time dependent data may not appear in search results at a current search time. Therefore, a solution is needed to provide all valid time dependent data within search results regardless of the expiration or beginning validity dates.

In a computing environment, data may be stored in objects. Each object may contain information associated with a particular agreement, employee, cost center or other information that may be used within the computing environment. A user of the system may wish to locate time dependent data associated with an object. Time dependent information may include the begin and end date for an employment contract, for example. Time dependent information has a defined period for which the data is valid. For example, if an employee begins working on Date A and ends working on Date B, the valid period of employment for that employee is the date range of Date A-Date B. The relationships between data may also be time dependent. For example, an employee may be related to work center A for a first time period and may be related to work center B for a second time period. Conventionally, significant system resources are required to locate an object and identify the valid time dependent data for that object. Further, objects with validity dates that do not overlap the particular time period being searched may be left out of the search results. Therefore, an improved method of searching for valid time dependent data within an enterprise application is needed.

BRIEF DESCRIPTION OF THE DRAWINGS

FIG. 1 is a logic flow illustrating an embodiment of the present invention.

FIG. 6 is a grouping diagram illustrating related time dependent information according to an embodiment of the present invention.

FIG. 7A illustrates an organization cluster for a base object according to an embodiment of the present invention.

FIG. 7B illustrates the result of a time slice calculation according to an embodiment of the present invention.

FIG. 7C illustrates the result of a stretching algorithm according to an embodiment of the present invention.

DETAILED DESCRIPTION

Figure 2:
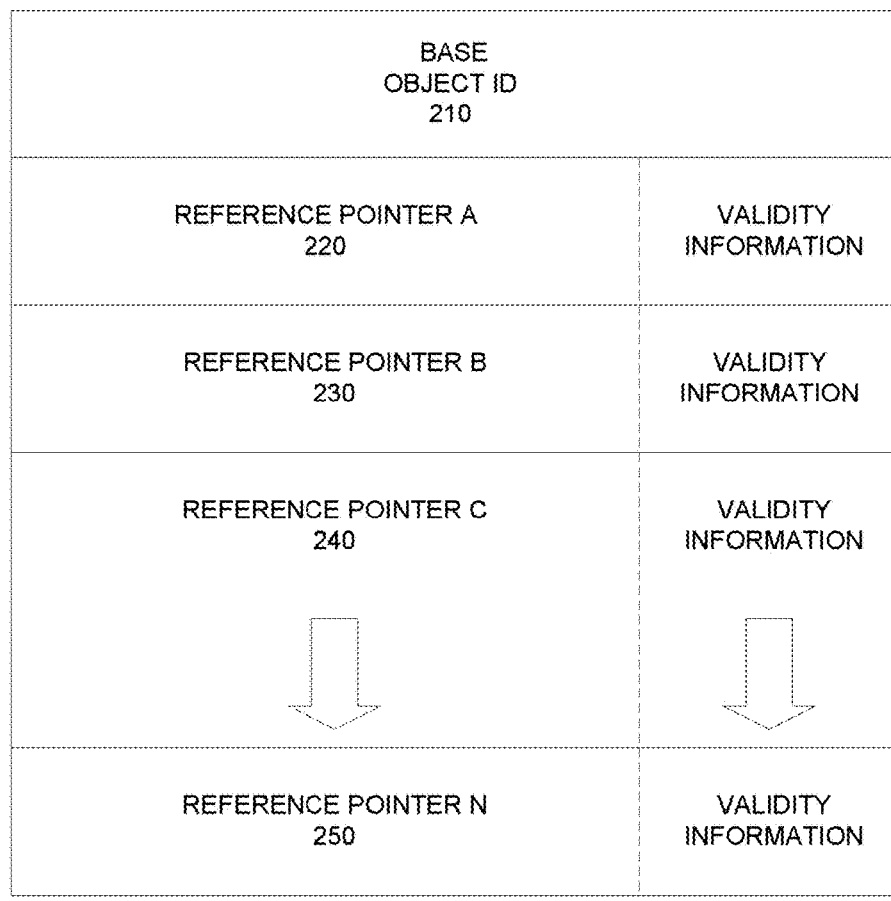
FIG. 2 illustrates a technical object according to an embodiment of the present invention.

Various embodiments disclose a method for searching for valid time dependent data within an enterprise application. A computer system may store "technical objects" that store references to valid time dependent data. The time dependent data may be stored in other data objects, called "base objects" herein. When a search manager receives a query, it may determine if the query references time dependent data and, if so, it may search a storage system of technical objects for a match. If a match is found, the search manager may traverse the reference stored by the technical object and retrieve responsive data from the referenced base object. One or more embodiments describe a method of searching for valid time-dependent data utilizing technical objects. Further, various embodiments describe a method of building and updating a technical object with references to valid time-dependent data.

Various embodiments may be generally directed to a method of searching for time dependent data. In one embodiment, for example, a search engine may be used to search for valid time dependent data using technical objects. The technical objects may be populated with references to base objects and "stretched" validity information. Time stretching logic may be used to "stretch" valid dates for time dependent data into the past or future if there are gaps of time that have no valid time dependent information. The stretched validity information may be stored in one or more technical objects stored in a search optimized storage system. For example, if the validity of the time dependent information stored within a base object starts in the future, a reference may be associated with a date in the future that the time dependent data is valid. If the validity of the time dependent information stored within the base object is current, a reference may be associated with a current date. If the validity of the time dependent information stored within the base object has expired, a reference may be associated with a date in the past that the time dependent information was valid. In addition, the time dependent search logic may be used to fill in any gaps, or time periods with no valid time dependent information. In this manner, valid time dependent information is available for all dates and may be quickly found using technical objects. Search engine performance is dramatically increased resulting in reducing the time needed to present search results to a user. Other embodiments may be described and claimed.

FIG. 1 is a logic flow illustrating a method for time dependent search. Logic flow 100 illustrates the steps taken to search for valid time dependent information using technical objects. At block 110, a search manager may receive a search query relating to time dependent information stored by a base object in a database. It is possible for the search manager to receive a query for information that is not time dependent, and if so, the search is handled in a manner consistent with conventional search techniques. The search query for time dependent information may be sent to the search manager by a user or an application within a computing system. The search query may identify one or more base objects and one or more time periods that should be searched. Instead of performing a time and resource intensive search for the valid time dependent information within a base object, the search manager may locate a technical object that is associated with one or more base objects.

At block 120, a storage system of technical objects may be searched for a technical object associated with the base object. The technical object may contain one or more references to valid time dependent information that is located within the base object. The one or more pointers or references may be chosen based upon a validity period of the time dependent information stored within a base object. Each instance of a technical object may also include validity information for the referenced time dependent information stored in the base object. The validity information may be stretched using time stretching logic. In this manner, regardless of the time period searched, the one or more references within the technical object may point to valid time dependent information within the base object. For example, if the base object is associated with an employee scheduled to begin employment three months from a current date, the employee may not appear in search results performed for the current date. To ensure that valid data is identified, the technical object may contain a reference to the employee's first valid date of employment, albeit three months in the future. The search manager may be able to identify this information simply by accessing the technical object associated with the base object. No further search is required for valid time dependent information.

At block 130, a base object referenced by the technical object may be accessed or retrieved. The base object may include valid time dependent data that matched the search query. The valid time dependent information may be identified using one or more references within a technical object. The references stored within a technical object may be pointers to a specific memory location of a computer-readable storage medium. Once identified using a technical object the valid time dependent information within a base object may be retrieved by the search manager. At block 140, the retrieved valid time dependent information may be sent to a display device. The display device may be within the same computing system as the search manager or may be connected to the search manager via a network connection.

In a preferred embodiment, the search manager may give priority to valid time dependent data based upon the relationship between the validity date and the date searched. For example, if a search is performed for valid time dependent data for a particular date, no valid time dependent data may exist on that date. However, valid time dependent data may exist in the past and the future of the searched date. The search manager may give priority to valid time dependent data that is in the future. Alternatively, the search manager may give priority to valid time dependent data that is in the past. The embodiments are not limited by this example.

FIG. 2 illustrates a technical object according to one embodiment. Technical object 200 contains one or more fields used to associate it with one or more base objects. Further, technical object 200 contains one or more references to valid time dependent information stored within an associated base object. Each reference may also include validity information that may define a validity period that the referenced time dependent data is valid.

A technical object may contain one or more pointers or references to valid time dependent information stored within a base object. The one or more pointers or references may be chosen based upon the validity of the time dependent information stored within a base object. Thus, when a user performs a search for time dependent data for a base object within a computing system, the computing system need only locate the technical object associated with the base object. No search for valid time dependent data is necessary during runtime. The technical objects may store, along with the references, validity period for the time dependent information. Once the technical object is located by the computing system, the computing system can quickly follow the references to valid time dependent data without performing any further search. This saves significant system resources and provides faster, more accurate results for users of the computing system.

Technical object 200 may include base object ID 200. Base object ID 200 may be used to associate technical object 200 with a base object. As previously discussed, technical object 200 may contain references to one or more base objects. Technical object 200 may further include reference pointers A, B, C and N, where N is any positive integer. Each of reference pointers A, B, C and N provide a pointer to valid time dependent information associated with the base object identified by base object ID 210. Each reference pointer may include an address to a specific memory or network location for valid time dependent information associated with a base object. Further, each reference may include validity information that may identify the validity period associated with the referenced time dependent information. The validity information stored within a technical object may be stretched using time stretching logic such that all time periods are associated with valid time dependent data.

Figure 3:
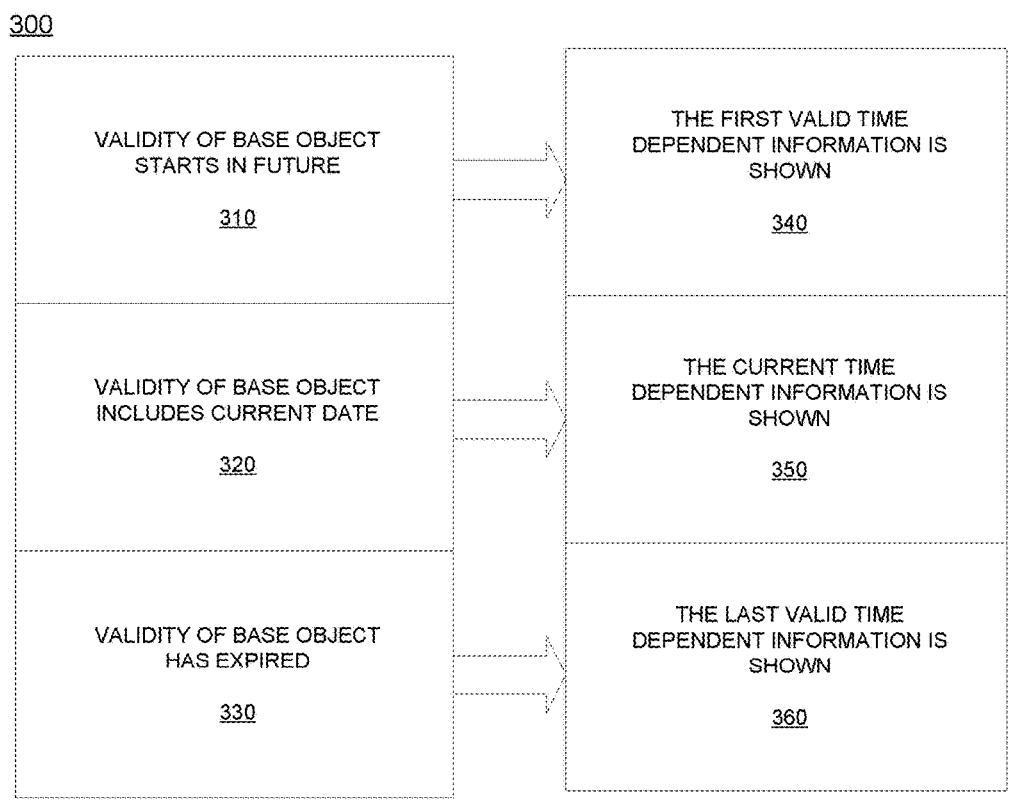
FIG. 3 is a flow diagram illustrating a time dependent search algorithm according to an embodiment of the present invention.

FIG. 3 illustrates a logic flow according to one embodiment. The logic flow may illustrate the results of a time stretching algorithm or logic according to an embodiment of the present invention. Block 310 illustrates a situation where the validity of the time dependent information of the base object starts in the future when compared to the currently requested search date. At block 340, the first valid time dependent information stored within the base object may be returned and displayed to a user. For example, if the currently requested search date is Sep. 1, 2000 and the first valid time dependent data is Sep. 1, 2001, the reference stored in the technical object will point to the Sep. 1, 2001 date. This essentially "stretches" the validity of the base object from Sep. 1, 2001 back to the currently requested search date of Sep. 1, 2000.

Block 320 illustrates a situation where the validity of the time dependent information of the base object is concurrent with the currently requested search date. At block 350, the current valid time dependent information stored within the base object may be returned and displayed to a user. For example, if the currently requested search date is Sep. 1, 2000 and the time dependent data is valid from Sep. 1, 1999 until Sep. 1, 2001, the reference stored in the technical object will point to the time dependent information of Sep. 1, 2000 date. There is no need to "stretch" the date in this situation because the time dependent information stored within the base object is currently valid.

Block 330 illustrates a situation where the validity of the time dependent information of the base object ended in the past when compared to the currently requested search date. At block 360, the last valid time dependent information stored within the base object may be returned and displayed to a user. For example, if the currently requested search date is Sep. 1, 2000 and the last valid time dependent data is Sep. 1, 1999, the reference stored in the technical object will point to the time dependent information of the Sep. 1, 1999 date. This essentially "stretches" the validity of the base object from Sep. 1, 1999 to the currently requested search date of Sep. 1, 2000.

Figure 4A:
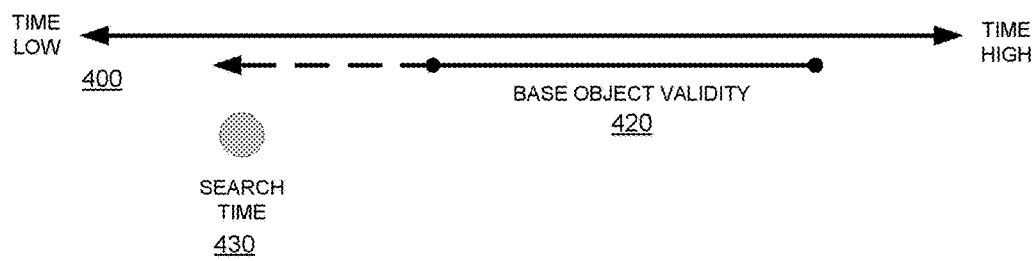
FIG. 4A is a timing diagram illustrating a time dependent search algorithm according to an embodiment of the present invention.

FIG. 4A is a timing diagram illustrating the logic flow discussed with respect to FIG. 3. As illustrated, timeline 400 includes an indication of TIME LOW and a TIME HIGH. Below timeline 400, validity period 420 is illustrated. Validity period 420 may represent the period for which particular time dependent information associated with a base object is valid. In particular, validity period may be denoted by the bold line. Below validity period 420, search time 430 is illustrated. Search time 430 may be a particular date or range of dates that a user wishes to query. Search time 430 may be the current time or date that a search takes place. For example, if a query does not include a specific date or date range, the search may be performed for the current date. As shown, validity period 420 may be in the future in relation to search time 430. Through the use of updated technical objects, validity period 420 may be "stretched" or extended to search time 430. The "stretching" of the time period is illustrated by the dotted line extending towards search time 430.

Figure 4B:
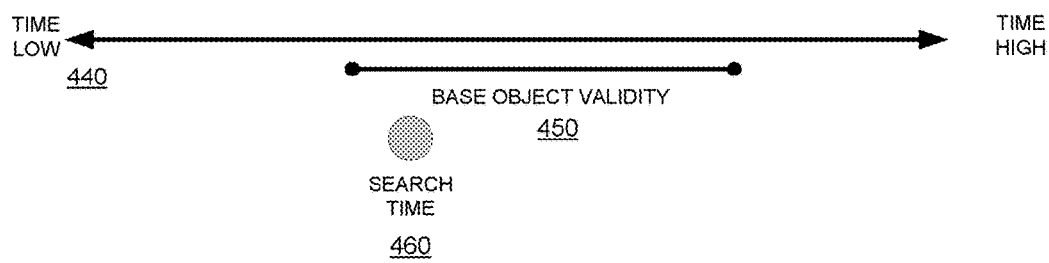
FIG. 4B is a timing diagram illustrating a time dependent search algorithm according to an embodiment of the present invention.

FIG. 4B is a timing diagram illustrating the logic flow discussed with respect to FIG. 3. As illustrated, timeline 440 includes an indication of TIME LOW and a TIME HIGH. Below timeline 440, validity period 450 may be illustrated. Validity period 450 may represent the period for which particular time dependent information associated with a base object is valid. In particular, validity period may be denoted by the bold line. Below validity period 450, search time 460 may be illustrated. Search time 460 may be the current time or date that a search takes place. Search time 430 may be a particular date or range of dates that a user wishes to query. As shown, validity period 460 is concurrent with search time 450. In this situation, the validity period may need not be stretched, however, a technical object is still update with a reference to valid time dependent information associated with the base object.

Figure 4C:
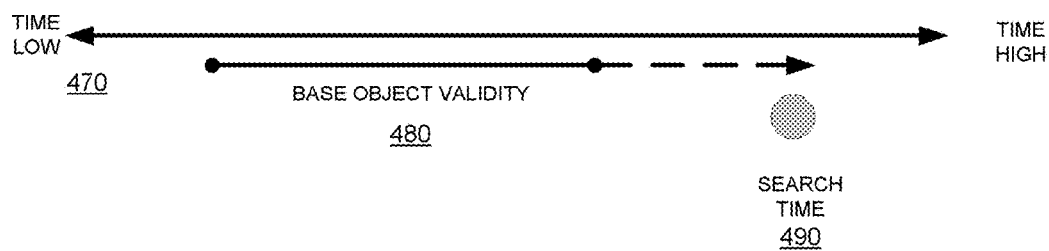
FIG. 4C is a timing diagram illustrating a time dependent search algorithm according to an embodiment of the present invention.

FIG. 4C is a timing diagram illustrating the logic flow discussed with respect to FIG. 3. As illustrated, timeline 470 includes an indication of TIME LOW and a TIME HIGH. Below timeline 470, validity period 480 may be illustrated. Validity period 480 may represent the period for which particular time dependent information associated with a base object is valid. In particular, validity period 480 is denoted by the bold line. Below validity period 480, search time 490 is illustrated. Search time 490 may be the current time or date that a search takes place. Search time 430 may be a particular date or range of dates that a user wishes to query. As shown, validity period 480 is in the future in relation to search time 490. Through the use of updated technical objects, validity period 480 may be "stretched" or extended to search time 490. The "stretching" of the time period may be illustrated by the dotted line extending towards search time 490.

Figure 5:
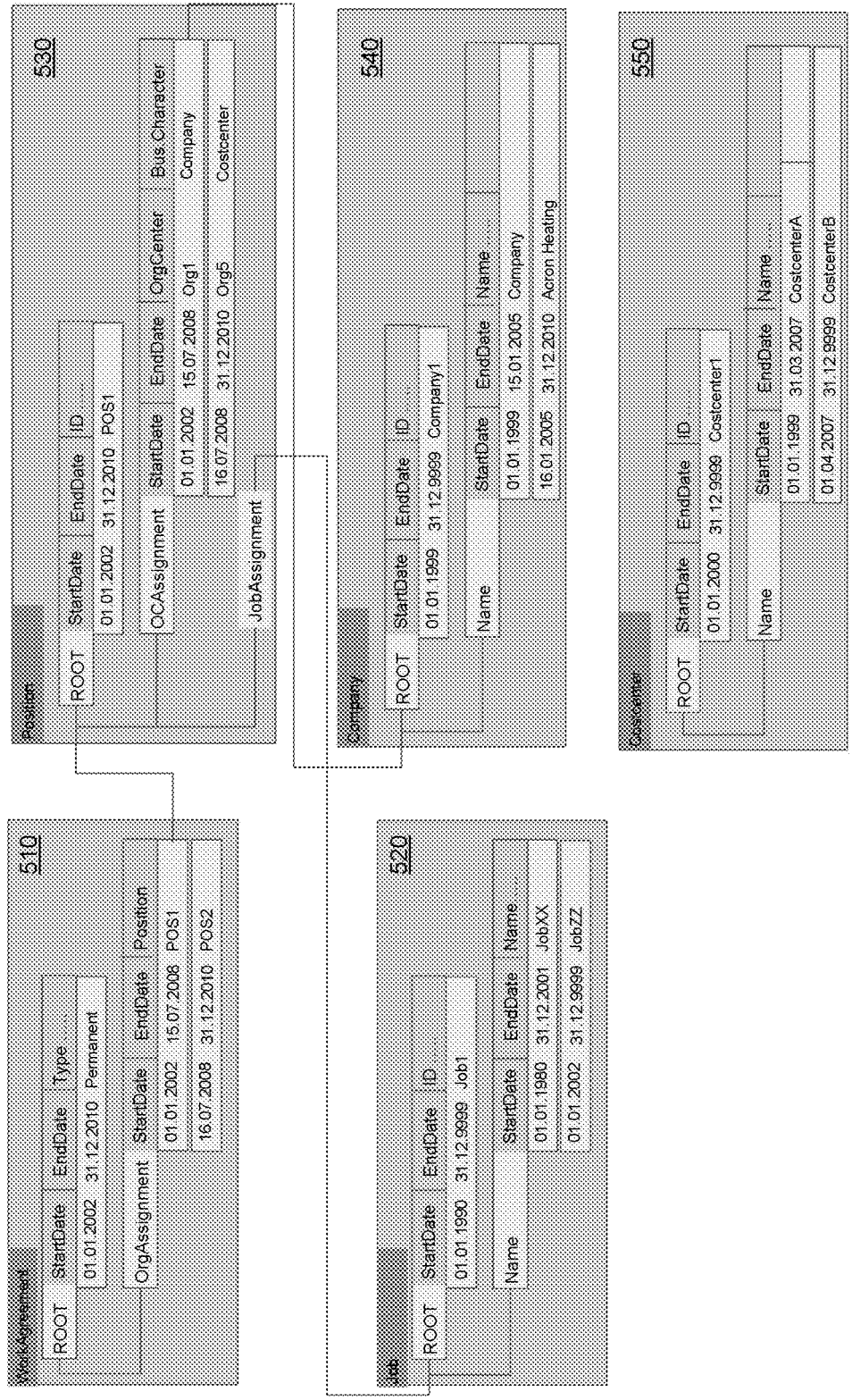
FIG. 5 illustrates data objects including time dependent data according to an embodiment of the present invention.

FIG. 5 is a relational diagram illustrating a plurality of base objects according to one embodiment. As shown, base objects may be linked together. For example, base object 510 may include information regarding a work agreement. The work agreement represented by base object 510 may be related to a position represented by base object 530. Each base object may contain time dependent information. For example, base object 530 may be linked to both base objects 520, 540 and 550. Base object 520 may include information regarding the start and end dates of JobXX and JobZZ. This information may be time dependent information.

FIG. 6 is a grouping diagram illustrating related time dependent information according to one embodiment. Search logic may be used to cluster time dependent information into logical groups. The search logic may create logical groups based upon a number of factors, including, but not limited to validity information, relationship information and name information. In this manner, related time dependent information can be organized into time slices of valid time dependent information. For example, information may be grouped into two groups: organizational assignments 600 and employment term references 610. The information may be retrieved from one or more base objects, such base objects 510-550. Once time dependent information has been clustered into logical groups, time stretching logic may stretch the validity information associated with the time dependent information such that all time periods contain valid information.

FIG. 7A illustrates an organization cluster for a base object according to one embodiment. As shown, time dependent information may include a begin date and an end date. Also, the time dependent data may be organized into related clusters of information. The validity of a base object for a work agreement is shown. Below, a listing of validity dates for cost center and reporting lines assignments is shown.

FIG. 7B illustrates the result of a time slice calculation according to one embodiment. Using the information available within FIG. 7A, a time slice calculation may be made to simplify the time dependent information. For example, the data from FIG. 7A is organized into the time slice calculation illustrated within FIG. 7B. Each record may be an instance of a technical object. As illustrated, each technical object may contain one or more references to base objects and validity information. All valid times are represented between Jan. 1, 2004 and Dec. 31, 2010. This corresponds to the validity period of the base objects as illustrated within FIG. 7A.

FIG. 7C illustrates the result of a stretching algorithm according to one embodiment. As illustrated, the validity dates may have been stretched such that valid time dependent information is available for all dates or date ranges. For example, the beginning validity date for RepLine1/not available may have been stretched to Jan. 1, 0001. Similarly, the end validity date for RepLine2/CostCenter2 may have been stretched to Dec. 31, 9999. In this manner, valid time dependent information will always be available for a base object, thus improving search performance and accuracy of search results.

Figure 8:
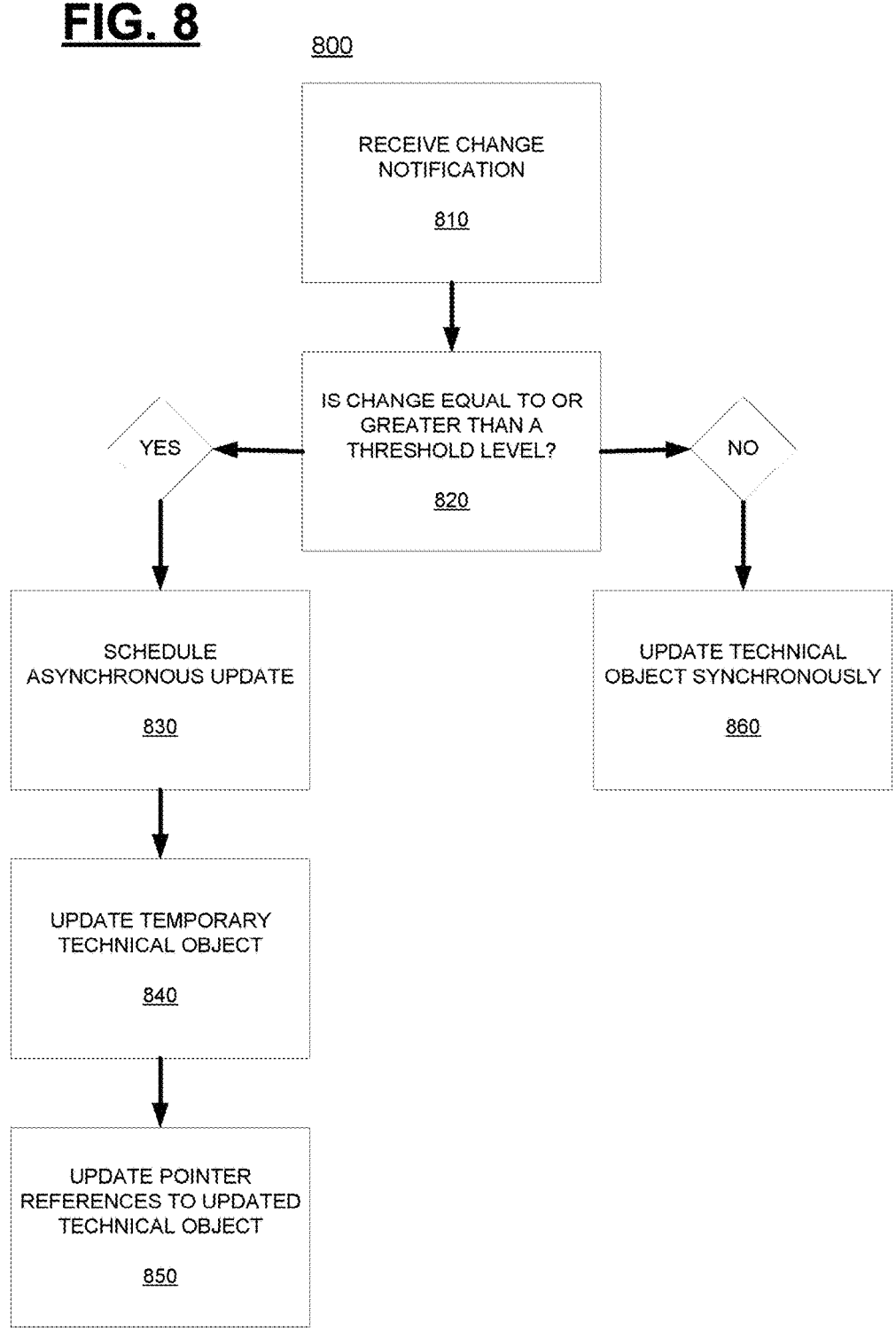
FIG. 8 is a logic flow according to an embodiment of the present invention.

FIG. 8 is a logic flow according to one embodiment. At step 810, a notification may be received that indicates a change to information has been made. A change manager may be used to listen for update to time dependent data. The enterprise system may push change notifications to the change manager, or the change manager may otherwise detect changes to time dependent data. Once a notification has been received, a reference to time dependent information may be updated based upon the notification.

At step 820, a decision may be made based upon whether the change is equal to or greater than a threshold level. Some changes may be insignificant, and thus can be updated synchronously without noticeable change in system performance. Large changes, however, may significantly slow down a system. To avoid this problem, the current solution may determine whether a change exceeds a threshold level. The threshold level may be measured in the amount of data, number of records, estimated time, or other indications as to the effect an update will have on the performance of a system.

Step 830 may be reached if a change meets or exceeds a threshold level. At step 830, an asynchronous update may be scheduled. Asynchronous updates may be scheduled to update a search optimized persistency. This may be scheduled using a scheduling manager or other application. The asynchronous update may be scheduled at a time when system resources are expected to be high, such as overnight. In the short term, however, asynchronous updates may be scheduled to be performed by background systems or tasks. Although changed data may not be immediately available, system performance is not interrupted for large changes to time dependent information.

At step 840, a temporary technical object is updated. A temporary technical object is used so that the primary technical object remains available for search during the time needed for an asynchronous update. At step 850, pointer references to the primary technical object may be changed to the recently updated temporary technical object. In this manner, the updated information may appear to have instantly been updated.

Step 860 may be reached if a received change is less than a predetermined threshold level. At step 860, a synchronous update may be performed directly on the primary technical object or used to synchronously update a search optimized persistency. Alternatively, a temporary technical object may be used, as in step 840, and pointer references may be changed once the change has been completely updated within the temporary technical object. However, in a preferred embodiment, the primary technical object may be update synchronously without affecting system performance because the change is below a predetermined threshold level.

In nearly all enterprise systems, data is regularly updated. The current solution provides a way to update technical objects in a fast and efficient manner. Further, base objects and technical objects may be stored within a search optimized persistency. The search optimized persistency may mirror a conventional database storing base objects. As new data is added, or current data is modified, the search optimized persistency needs to be updated with the most current data. While it may take some time to update the search optimized persistency, significant speed improvements are realized during search operations.

Figure 9:
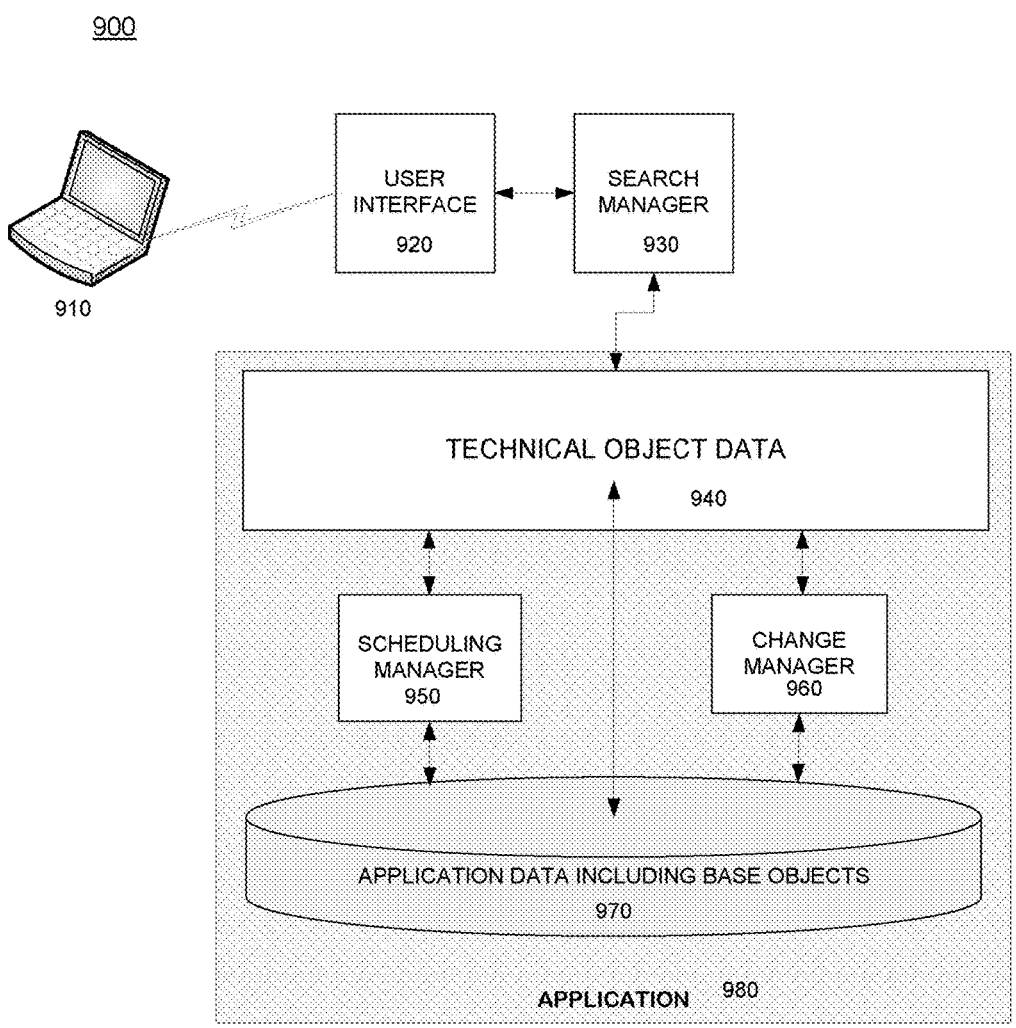
FIG. 9 illustrates a system for time dependent search according to an embodiment of the present invention.

FIG. 9 is a system according to an embodiment. System 900 includes computing system 910. Computing system 910 may include a processor, display, memory, input/out devices and one or more network connection interfaces. Computing system 910 may be used to execute one or more instructions or logic as illustrated in the above described figures. User interface 920 may include one or more graphical user interface elements that are used to display information to a user of computing system 910. For example, user interface 920 may include an interface that allows a user to enter a search query. Further, user interface 920 may display results from a previously executed search query.

System 900 may include search manager 930. Search manager 930 may receive a search query that was entered by a user into user interface 920. The search query may request time dependent information stored within a base object, for example. Upon receiving a search query for time dependent information, search manager 930 accesses application 980. Application 980 may be an enterprise system application, such as a human resources application, for example. In particular, search manager 930 may access a search optimized storage system storing technical object data 940. Technical object data 940 may be a search optimized persistency used to quickly access stored information. Technical object data 940 may include one or more references to time dependent data stored by application data 970. Technical object data 940 may associate validity information with one or more references to time dependent data stored by application data 970. Application data 970 may be used to store one or more base objects, each including time dependent information and validity period information related to each instance of time dependent information.

Search manager 930 may access technical object data 940 and retrieve a reference that matched a search query. The reference may point to a location in a memory device that stores time dependent information of a base object. Search manager 930 may retrieve the matching time dependent information and send it to user interface 920. Within user interface 920, the time dependent information may be presented to a user of computing system 910 as a series of columns, rows, windows and/or other graphical user interface elements.

System 900 may include scheduling manager 950. Scheduling manager 950 may be implemented in software and may be stored on a memory of computing system 910. Scheduling manager may be responsible for scheduling updates to technical objects in response to change notifications. System 900 also includes change manager 960. Change manager 960 may listen for changes to time dependent data, or otherwise detect changes to time dependent data.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A computer-implemented method for searching for time dependent information implemented by at least one computing device having one or more data processors, the method comprising:
   clustering, by at least one data processor, a plurality of base objects into respective logical groups, wherein each base object includes time dependent information and wherein each logical group is organized into a plurality of validity time periods containing time slices of valid time dependent information;
   establishing, by the at least one data processor, links between a plurality of technical objects and the plurality of base objects by associating fields of the plurality of technical objects with the plurality of base objects;
   storing, by the at least one processor, the linked plurality of technical objects and the plurality of base objects in a storage system;
   receiving, by the at least one data processor, a query relating to time dependent information;
   searching, by the at least one data processor, the storage system for a technical object that matches the query;
   identifying, by the at least one data processor in response to the technical object being outside a validity time period of the technical object, logical groups whose time slices cumulatively cover discontinuous time periods;
   for the identified logical groups, stretching, by the at least one data processor, the validity time period for select technical objects associated with the identified logical groups, each of the plurality of technical objects having at least one reference to a base object, the validity time period for the select technical object being stretched by time stretching logic to extend backwards in time from an earliest beginning time of the time dependent information and to extend forwards in time from a latest end time of the time dependent information to cover all time periods, wherein the stretching results in valid time dependent data being available for each logical group;
   storing the stretched validity time period in a storage system;
   retrieving the base object referenced by the technical object;
   receiving a notification, by the at least one data processor, that the time dependent information stored by the base object has been updated to reflect the stretched validity time period;
   determining, by the at least one data processor, that the stretched validity time period is below a threshold level; and
   choosing, by the at least one data processor, a new validity time period for each technical object based upon the stretched validity time period being below the threshold level.

2. The method of claim 1, wherein the storage system of technical objects is a search-optimized persistency.

3. The method of claim 1, wherein the time dependent information is organized into logical groups.

4. The method of claim 1, wherein if the validity time period of the time dependent information stored by the base object starts after a queried time period, time dependent information associated with a first date in the future that the time dependent data is valid is retrieved.

5. The method of claim 1, wherein if the validity time period of the time dependent information stored by the base object overlaps a queried time period, time dependent information associated with a current date is retrieved.

6. The method of claim 1, wherein if the validity time period of the time dependent information stored by the base object expired before a queried time period, time dependent information associated with a last date in the past that the time dependent information was valid is retrieved.

7. An article comprising a non-transitory computer-readable storage medium storing instructions which, when executed by at least one data processor forming part of at least one computing device implement operations comprising:
   clustering a plurality of base objects into respective logical groups, wherein each base object includes time dependent information and wherein each logical group is organized into a plurality of validity time periods containing time slices of valid time dependent information;
   establishing links between a plurality of technical objects and the plurality of base objects by associating fields of the plurality of technical objects with the plurality of base objects;
   storing the linked plurality of technical objects and the plurality of base objects in a storage system;
   receiving a query relating to time dependent information;
   searching the storage system of technical objects for a technical object that matches the query;
   identifying, in response to the technical object being outside a validity time period for the technical object, logical groups whose time slices cumulatively cover discontinuous time periods;

for the identified logical groups, stretching the validity time period for select technical objects associated with the identified logical groups, each of the plurality of technical objects having at least one reference to a base object the validity time period for each technical object being stretched by time stretching logic to extend backwards in time from an earliest beginning time of the time dependent information and to extend forwards in time from a latest end time of the time dependent information to cover all time periods, wherein the stretching results in valid time dependent data being available for each logical group;

storing the stretched technical objects in a storage system;

retrieving the base object referenced by the technical object;

receiving a notification, by the at least one data processor, that the time dependent information stored by the base object has been updated to reflect the stretched validity time period;

determining, by the at least one data processor, that the stretched validity time period is below a threshold level; and choosing, by the at least one data processor, a new validity time period for each technical object based upon the stretched validity time period being below the threshold level.

8. The article of claim 7, wherein the storage system of technical objects is a search-optimized persistency.

9. The article of claim 7, wherein the time dependent information is organized into logical groups.

10. The article of claim 7, wherein if the validity time period of the time dependent information stored by the base object starts after a queried time period, time dependent information associated with a first date in the future that the time dependent data is valid is retrieved.

11. The article of claim 7, wherein if the validity time period of the time dependent information stored by the base object overlaps a queried time period, time dependent information associated with a current date is retrieved.

12. The article of claim 7, wherein if the validity time period of the time dependent information stored by the base object expired before a queried time period, time dependent information associated with a last date in the past that the time dependent information was valid is retrieved.

13. A system comprising:
at least one data processor; and
memory storing instructions which, when executed by the at least one data processor, implement operations comprising:
clustering, by at least one data processor, a plurality of base objects into respective logical groups, wherein each base object includes time dependent information and wherein each logical group is organized into a plurality of validity time periods containing time slices of valid time dependent information;
establishing, by the at least one data processor, links between a plurality of technical objects and the plurality of base objects by associating fields of the plurality of technical objects with the plurality of base objects;
storing, by the at least one processor, the linked plurality of technical objects and the plurality of base objects in a storage system;
receiving, by the at least one data processor, a query relating to time dependent information;
searching, by the at least one data processor, the storage system for a technical object that matches the query;
identifying, by the at least one data processor in response to the technical object being outside a validity time period of the technical object, logical groups whose time slices cumulatively cover discontinuous time periods;
for the identified logical groups, stretching, by the at least one data processor, the validity time period for select technical objects associated with the identified logical groups, each of the plurality of technical objects having at least one reference to a base object, the validity time period for the select technical object being stretched by time stretching logic to extend backwards in time from an earliest beginning time of the time dependent information and to extend forwards in time from a latest end time of the time dependent information to cover all time periods, wherein the stretching results in valid time dependent data being available for each logical group;
storing the stretched validity time period in a storage system;
retrieving the base object referenced by the technical object;
receiving a notification, by the at least one data processor, that the time dependent information stored by the base object has been updated to reflect the stretched validity time period;
determining, by the at least one data processor, that the stretched validity time period is below a threshold level; and
choosing, by the at least one data processor, a new validity time period for each technical object based upon the stretched validity time period being below the threshold level.

14. The system of claim 13, wherein if the validity time period of the time dependent information stored by the base object starts after a queried time period, time dependent information associated with a first date in the future that the time dependent data is valid is retrieved.

15. The system of claim 13, wherein if the validity time period of the time dependent information stored by the base object overlaps a queried time period, time dependent information associated with a current date is retrieved.

16. The system of claim 13, wherein if the validity time period of the time dependent information stored by the base object expired before a queried time period, time dependent information associated with a last date in the past that the time dependent information was valid is retrieved.

17. The system of claim 13, wherein the time dependent information is organized into logical groups.

* * * * *